Aug. 13, 1940.   R. K. BONELL   2,210,970
DISPLACEMENT AND ACCELERATION MEASURING APPARATUS
Filed Aug. 26, 1937   3 Sheets-Sheet 1

INVENTOR
RALPH K. BONELL
BY Herbert H. Thompson
HIS ATTORNEY

INVENTOR
RALPH K. BONELL
BY
HIS ATTORNEY

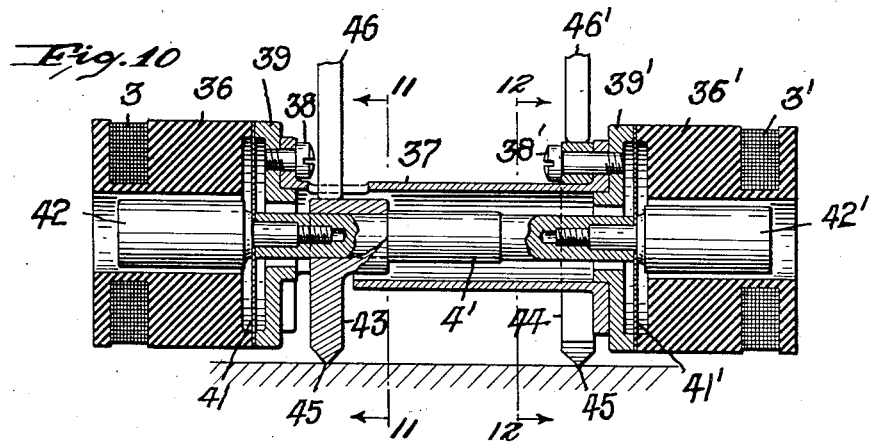
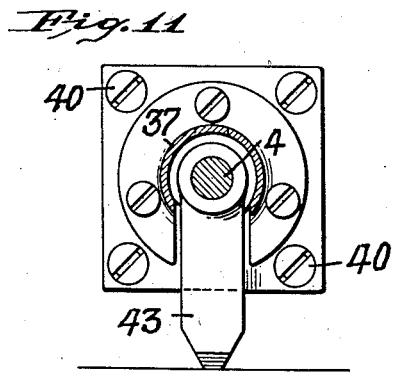
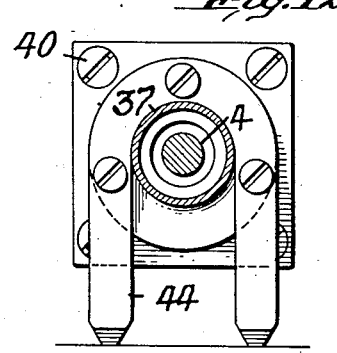
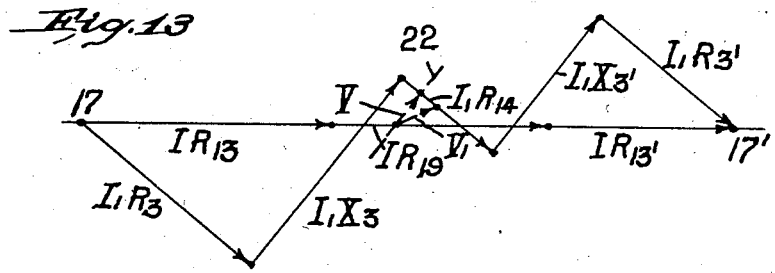
INVENTOR
RALPH K. BONELL
BY Herbert H. Thompson
HIS ATTORNEY.

Patented Aug. 13, 1940

2,210,970

UNITED STATES PATENT OFFICE 2,210,970

DISPLACEMENT AND ACCELERATION MEASURING APPARATUS

Ralph K. Bonell, New York, N. Y., assignor to Sperry Gyroscope Company, Inc., Brooklyn, N. Y., a corporation of New York Application August 26, 1937, Serial No. 160,949

8 Claims. (Cl. 177—351)

This invention relates, generally, to the measurement of displacements and accelerations, and the invention has reference, more particularly, to a novel strain gauge and accelerometer for measuring strains in bodies such as in structural parts of aircraft in flight, and for measuring accelerations such as the acceleration or deceleration of an aircraft.

The principal object of the present invention is to provide novel apparatus employing inductance means, variable in accordance with the strain or acceleration being measured, for controlling an indicator serving to visually indicate the magnitude of such strain or acceleration.

Another object of the present invention lies in the provision of novel apparatus of the above character employing a pair of solenoids arranged in an A. C. bridge circuit and cooperating rigidly interconnected cores for oppositely varying the inductance of said solenoids in accordance with the acceleration or strain measured, the voltage across the neutral wire of the bridge circuit being employed for controlling the strain or acceleration indicator used.

Other objects and advantages will become apparent from the specification, taken in connection with the accompanying drawings wherein the invention is embodied in concrete form.

In the drawings:

Fig. 10 is a vertical sectional view of a practical form of strain gauge.

Fig. 11 is a sectional view taken along line 11—11 of Fig. 10, looking in the direction of the arrows.

Fig. 12 is a sectional view taken along line 12—12 of Fig. 10, looking in the direction of the arrows.

Fig. 13 is a vector diagram illustrating the operation of the bridge circuits used.

Similar characters of reference are used in all of the above figures to indicate corresponding parts.

Figure 1:
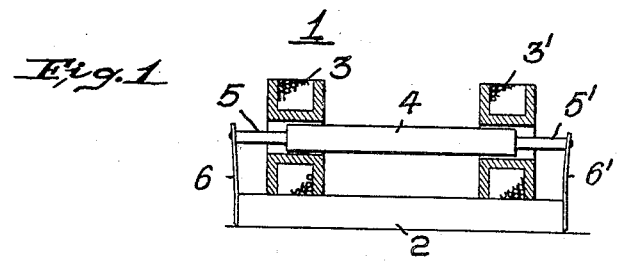
Fig. 1 is a schematic view, partly in section, illustrating the elements of the accelerometer of this invention.

Referring now to Fig. 1, the reference numeral 1 designates the novel accelerometer of this invention as a whole. This instrument comprises a suitable base 2 upon which are mounted axially aligned and spaced similar coils 3, 3'. The coils 3, 3' are preferably located a sufficient distance apart so that the mutual inductance between them is small compared with their self inductances, and though the magnetic coupling between them is small, they should, preferably, be connected so that their fields oppose one another.

A bar 4 of material of high permeability, such as iron or iron alloy, extends between coils 3, 3' and has its end portions terminating within those coils. Bar 4 is provided with projecting pins 5, 5' of non-magnetic material at its ends, which pins have reduced outer end portions projecting through apertures provided in the upper end portions of upstanding leaf springs 6, 6' secured at their lower ends to the base 2, thereby supporting the bar 4 on the upper ends of these springs. The springs 6, 6' are adapted to deflect in a direction parallel to the axis of bar 4, but are rigid in other directions, thereby supporting the bar centrally within the central coil openings, while permitting longitudinal movement of this bar under accelerating forces. The bar 4 and springs 6 are of relatively small mass so that the natural frequency of vibration of the system 6, 5, 4, 5', 6' is high in comparison with the frequency of the acceleration changes to be measured. The relative stiffness of springs 6 also affects this frequency.

In use, the base 2 is attached to the member whose acceleration is to be measured, and when the accelerometer is subjected to an acceleration, the springs 6, 6' deflect due to the inertia of the bar 4, which deflection is directly proportional to the acceleration. As the springs 6, 6' deflect, the bar 4 is displaced along the common axis of solenoids 3, 3'. This change of position causes the inductance of one solenoid to increase while that of the other decreases.

Figure 2:
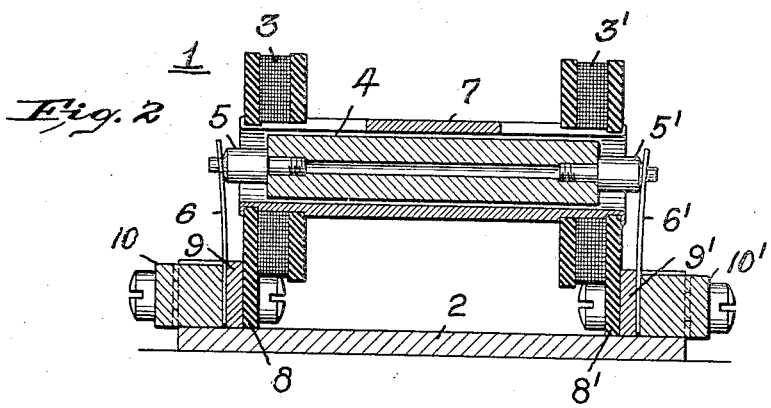
Fig. 2 is a central, longitudinal sectional view of a practical form of the accelerometer.
Figure 3:
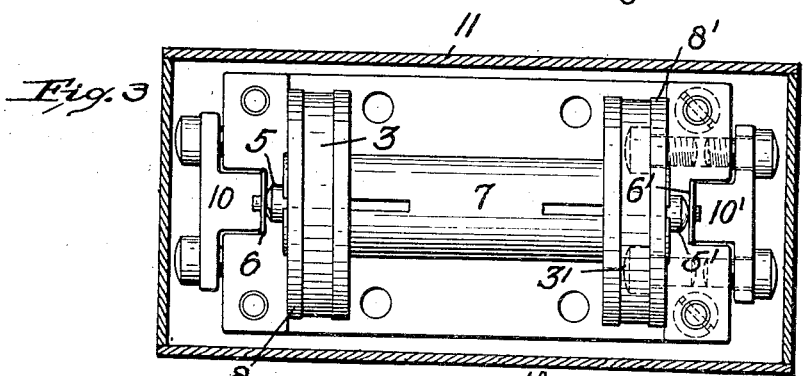
Fig. 3 is a plan view of the accelerometer.

As shown in Figs. 2 and 3, illustrating the practical form of the invention, the solenoids 3, 3' have an axial thickness that is small in comparison with the mean diameter of the same. A tube 7 of brass or other non-magnetic material is shown interconnecting the coils 3, 3' for supporting the windings thereof upon the coil insulating supports 8, 8' that are secured, as by the screws shown, to base blocks 9, 9' attached to base 2. The springs 6, 6' are also rigidly attached to base blocks 9, 9' by clamps 10, 10'.

The changes of inductance of the coils due to movement of the core 4 are substantially directly proportional to the displacement of the core 4 over wide ranges. A device as shown full size in Fig. 2 or Fig. 10 will show a substantially linear characteristic of the change of impedance with respect to displacement for a movement of about ±1/16″. As the range normally used in measuring strains is only of the order of thousandths of an inch and the displacement of the device is seldom more than 1/8″ in measuring accelerations, it is obvious that it is only important to have the initial position of the core 4 located longitudinally within the coils with a fairly high degree of accuracy where unusual conditions require the widest possible displacement range. This feature is of importance, as the device may be mounted at an inaccessible point of a structure, where close mechanical readjustments are impossible. The initial unbalance of the inductances caused by mechanical misalignment can be compensated for electrically by resistances 14, 19 and 20 of Fig. 4 as will be described hereinafter, and this could be done at an accessible point, remote from the actual measuring device, which would not have to be touched at all.

In some instances, the bar 4 may be a compound member having its central connecting portion preferably of non-magnetic material and its end portions of magnetic material, as illustrated in the structure of Fig. 10. In such case the end portions of the bar should preferably be at least twice as long as the axial thickness of the coils. Also, in some cases it is desirable to provide suitable damping means for the movable system 6, 4, 6′ for absorbing vibrations at the natural frequency of the instrument, and this may be accomplished by enclosing the instrument in a casing 11 (see Fig. 3) filled with a suitable viscous fluid such as oil.

Figure 4:
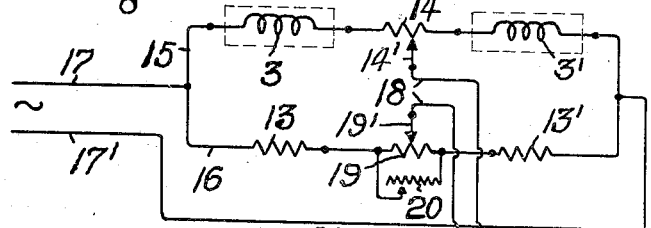
Fig. 4 is a wiring diagram showing a bridge circuit adapted to be employed in connection with the accelerometer, together with indicator means operated therefrom.
Figure 4:
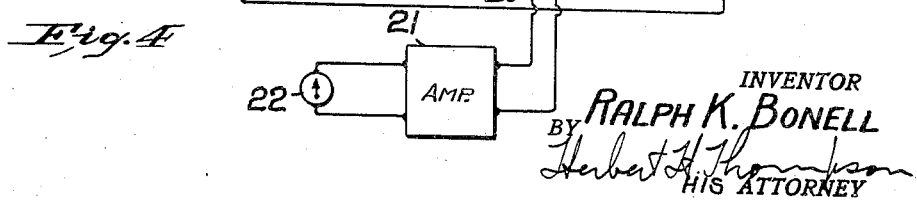

The change of inductance of the coils, which is proportional to acceleration, is converted into electrical quantities by an A. C. bridge circuit such as shown in Fig. 4. The two coils or solenoids 3, 3′ form the impedances of the two arms of the upper branch 15 of the bridge, and balancing impedances shown as resistances 13, 13′ are provided for the two arms of the lower branch 16 of the bridge. The bridge is supplied with A. C. through leads 17, 17′. Even though the coils 3, 3′ are similar, their inductances and resistances generally will not be the same. In series with and between coils 3, 3′ is a resistance 14 provided with a slider 14′ connected to one of the output leads 18, the position of which slider along resistance 14 determines the division of the total resistance of the upper branch between the two arms thereof and provides, among other things, for adjusting the phase angles of the impedances of the two guage coils to equality.

A resistance 19 is connected between resistances 13, 13′ in branch 16 and is provided with a slider 19′ connected to the other output lead 18, the position of slider 19′ determining the division of the total resistance between the arms of this branch. The two parts into which this resistance is divided form what are commonly considered the ratio arms of a bridge and for balance have the same ratio as the impedances of the two gauge coils provided these impedances have been adjusted to equal phase angles.

An adjustable resistance 20 is connected in parallel across resistance 19. The output leads are connected to a linear amplifier 21, the output of which is supplied to an acceleration indicator or meter 22 of the voltmeter type.

In describing the operation of the device, variations in the output of the bridge circuit are assumed for simplicity to be due only to changes in the inductances of coils 3 and 3′, the resistances of these coils being assumed to be substantially constant. The operation is best understood by reference to the vector diagram of Fig. 13. In this diagram, the voltage across the supply leads is represented by the length of the horizontal line between points 17, 17′. Since the lower branch 16 contains resistances only, the current I in this branch is in phase with the supply voltage, and the drops across resistances 13, 19 and 13′ are represented by $IR_{13}$, $IR_{19}$ and $IR_{13'}$ respectively, the magnitudes of these voltage drops being arbitrarily chosen for purposes of illustration. Owing to the presence of the inductances 3 and 3′ in the upper branch 15, the current $I_1$ in this branch will lag the supply voltage so that the voltage drop due to the resistance of coil 3 is represented as $I_1R_3$. The angle between $I_1R_3$ and $IR_{13}$ is the phase angle of the total impedance of branch 15 of the bridge circuit. The voltage drop due to the inductive reactance of coil 3 will lead the drop due to resistance of this coil by 90° and is represented by $I_1X_3$. The drop due to resistance 14 will be in phase with the current $I_1$ and is represented by $I_1R_{14}$ parallel to $I_1R_3$. The drop due to the inductive reactance of coil 3′ will lead the current $I_1$ by 90° and is represented by $I_1X_{3'}$, whereas the resistance drop due to this coil is represented by $I_1R_{3'}$ parallel to $I_1R_{3'}$ in phase with the current $I_1$.

As long as the instrument is not subjected to an acceleration, which causes bar 4 to be displaced with respect to the coils, the output voltage across leads 18 is fixed and its value is determined by the adjustment of sliders 14′ and 19′. This voltage may be made equal to zero if the instrument is to be used for indicating accelerations in one direction only, whereas if the instrument is to be used for measuring accelerations in opposite directions, this voltage should have at least as great a value as the maximum voltage change produced by the accelerations measured.

Since a change in acceleration is assumed to produce a change in the inductance only of coils 3, 3′ and hence a change in the reactive voltage drops across these coils, the vector representing the unbalance or output voltage of the instrument should be parallel to the reactance voltage vectors $I_1X_3$ and $I_1X_{3'}$. Thus, assuming that $V_1$ represents the output voltage obtained with given initial positions of the sliders 14′ and 19′, to obtain an output voltage in the correct phase relation it is merely necessary to shift slider 14′ while keeping slider 19′ fixed until the minimum voltage output is obtained showing that the phase of this voltage extends along dotted line 22 parallel to $I_1X_3$ and $I_1X_{3'}$, the magnitude of the voltage being represented by V. If sliders 14′ and 19′ are now moved together at the proper rates, the magnitude of the output or unbalanced voltage V can be varied while keeping its phase angle constant. By adjusting resistor 20, and thereby adjusting the magnitude of the voltage drop $I_1R_{14}$, this condition can be fulfilled when sliders 14′ and 19′ travel across their respective resistance windings at equal rates.

Any acceleration to which the instrument is subjected by displacing bar 4 and differentially changing the inductances of coils 3 and 3′, will cause changes in V proportional thereto, thereby causing the acceleration indicator 22 to correspondingly indicate the magnitude of such acceleration or changes thereof.

Figure 5:
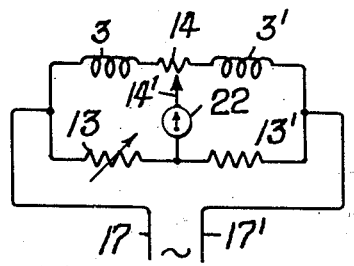
Figs. 5 to 9 show slightly modified wiring diagrams that may be employed.
Figure 6:
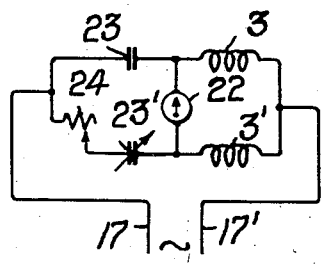

Slightly modified forms of bridge circuits which may be used in connection with the accelerometer are shown in Figs. 5 and 6, parts of these figures corresponding to similar parts of Fig. 4 being similarly numbered. In Fig. 5 the initial adjustment of the instrument circuit is obtained by adjusting resistor 13 and slider 14'. In Fig. 6 capacitors 23, 23' and resistance 24 are employed for completing the bridge, the coils 3, 3' being arranged in different branches of the bridge.

Figure 7:
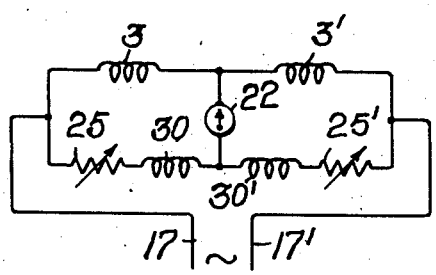

In some instances, it is advisable to measure not a single acceleration but the sum or difference of two different accelerations. A bridge circuit arrangement for accomplishing this result is shown in Fig. 7 wherein the coils 3, 3' of one accelerometer are arranged in one branch of the bridge circuit and coils 30, 30' of another accelerometer are arranged in the other branch of the bridge circuit. Variable resistances 25 and 25' are employed for adjusting the phase of coils 30, 30' to correspond to that of coils 3, 3'. With this arrangement, the indicator will give the sum or difference of the accelerations measured by the two accelerometers used, depending on how the terminals of the accelerometer are connected in the bridge circuit.

Figure 8:
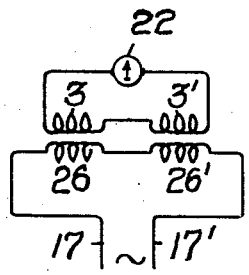

In Fig. 8 a somewhat modified circuit arrangement is used wherein coils 26 and 26' supplied from source 17, 17' are inductively related to coils 3 and 3' and serve to induce equal opposing voltages in coils 3, 3' so that meter 22 reads zero under conditions of zero acceleration. However, when an acceleration takes place, the inductive reactances of coils 3, 3' change oppositely, thereby upsetting this balanced condition and causing indicator 22 to show the magnitude of the acceleration.

Figure 9:
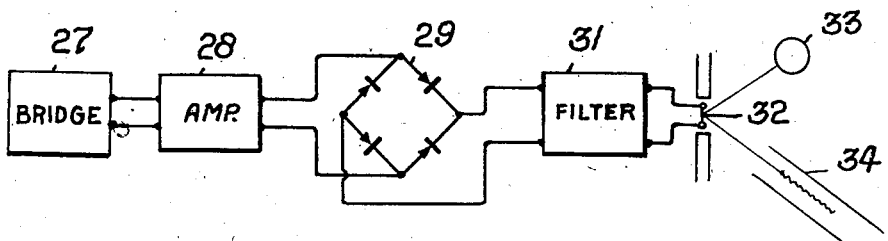

When it is desired to record the accelerations indicated by the accelerometer, it may be desirable to employ a D. C. output. Such an arrangement is shown in Fig. 9 wherein the accelerometer bridge 27 is shown connected through an amplifier 28 and rectifier 29 of the bridge type, which latter rectifies the amplified A. C. output of bridge 27. The output of rectifier 29 is passed through filter 31 which removes the A. C. ripple and is supplied to an electromagnetic oscillograph mirror galvanometer 32 that serves to deflect a light beam from a source 33, which deflected beam is used to produce a photographic record of the accelerations measured on the film 34.

In the Figs. 10 to 12 a strain gauge is illustrated embodying the principles of the present invention, the operation of the gauge being dependent on the change of inductance of coils 3, 3' just as in the case of the accelerometer of the preceding figures. In this form of the invention, the coils 3 and 3' are shown wound on insulating blocks 36 and 36' of Bakelite or other suitable material, blocks 36 and 36' being shown as of square cross-section and having central aligned openings for receiving the end portions of the compound bar 4' corresponding to bar 4 of preceding figures. Blocks 36, 36' are rigidly interconnected by the frame or tube 37 preferably of a material having an extremely low coefficient of thermal expansion, such as "Invar", whose centigrade coefficient is less than .000001. Tube 37 has flanged ends that are secured as by screws 38, 38' to square, centrally apertured plate members 39 and 39' that are attached in turn by screws 40 to the blocks 36 and 36'. Disk or leaf springs 41 and 41' are clamped at their peripheries between plate members 39 and 39' and blocks 36 and 36' and serve to support the bar 4' so that the same is held centrally with respect to blocks 36 and 36' and tube 37 while permitting longitudinal movement of the bar 4' within the coils 3 and 3'.

The bar 4' has its central portion preferably made of low permeability material having a low coefficient of thermal expansion, such as "Invar," while its end portions 42 and 42' are of high permeability material and constitute armatures threaded to the central portion, which armatures are movable within coils 3, 3'. Knife edge members 43 and 44 are secured respectively to bar 4' and tube 37 and are provided at their lower ends with hardened knife edged gauge points 45. The member 43 has but a single point 45, whereas the inverted U-shaped member 44 has a pair of transversely spaced points 45, the longitudinal distance between the point 45 of member 43 and the points 45 of member 44 constituting the base in which the strain is to be measured.

Since the tube 37 and central portion of bar 4' are of material having an extremely low coefficient of thermal expansion, and since the knife edge members are attached to these parts, the accuracy of the instrument is not affected by changes in temperature, any change in length of armature 42 and block 36, for example, due to temperature change being compensated for by a corresponding change in length of 42' and 36'.

In use, the instrument is clamped to the material or body in which the strain is to be measured as by means of suitable clamps 46, 46', the knife edges 45 being preferably seated in scratches or prick punch marks on the surface of the material. Any deformation of the material that changes the length of the base will change the relative position of the solenoids 3, 3' and the bar 4', thereby upsetting the bridge circuit balance in the same manner as described in connection with the accelerometer of Figs. 1 to 9. Any of the bridge circuits described in connection with the accelerometer may be used with the strain gauge.

In those cases where it is not desired to measure the entire strain occurring in the material but a difference of two strains, for example, the difference between the strains due to an axial load and to bending, the arrangement of Fig. 7 may be used, 36, 36' being the coils of the second strain gauge. By proper adjustment of the coil connections, the output of the bridge may be made proportional to either the sum or the difference of the separate strains. In the form of the invention shown in Fig. 7, in order to adjust the initial unbalance of the bridge it is desirable that one or more of the inductance coils 3, 3' or 30, 30' should be variable or, if desired, an additional variable inductance may be added in the bridge to accomplish this result.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. An electro-magnetic accelerometer comprising a pair of coaxial solenoids having an axial width small in comparison with their mean diameter, a tubular member of non-magnetic material spacing the same axially, a base for supporting said spaced solenoids, resilient members mounted thereon, a cylindrical core member of high permeability low retentivity material supported by said resilient members coaxial with said solenoids and extending substantially between the centers thereof, said core and said resilient members forming an oscillatory system having a natural frequency high in comparison with the rates of change of acceleration to be measured, and viscous damping means for preventing free vibration of the system at its natural frequency.

2. Apparatus for measuring acceleration comprising an accelerometer in accordance with claim 1, impedance elements connected to the solenoids thereof to form a bridge network including means for compensating for a difference between the effective resistances of said solenoids and other means for balancing the bridge for alternating current, means connected to a pair of bridge points for rectifying the A. C. potential therebetween and for generating a D. C. potential proportional to bridge unbalance, said unbalance being normally caused by relative displacement of the core and solenoids under the influence of acceleration and being proportional to said acceleration, and an indicator responsive to said D. C. potential.

3. A strain gauge comprising a pair of coaxial solenoids, a support for each, a tubular member of material having a low thermal coefficient of expansion spacing the same, a pair of resilient diaphragms mounted on said supports for flexure along the axis of said solenoids, a composite cylindrical bar comprising end portions of high permeability, low retentivity material and a central portion of low permeability material supported by said diaphragms coaxial with said solenoids and extending between the approximate centers thereof, a knife edge mounted on said bar, and a second knife edge mounted on one of said supports whereby relative displacement of said knife edges causes relative displacement between said bar and said solenoids.

4. Apparatus for measuring strain comprising a strain gauge according to claim 3, impedance elements connected to the solenoids thereof to form a bridge network including means for compensating for a difference between the effective resistances of said solenoids and other means for balancing the bridge for alternating current, means connected to a pair of bridge points for rectifying the A. C. potential therebetween and for generating a D. C. potential proportional to bridge unbalance, said unbalance being normally caused by relative displacement of the knife edges under the influence of strain and being proportional to said strain and an indicator responsive to said D. C. potential.

5. Displacement and acceleration measuring apparatus comprising a pair of spaced coaxial solenoids, a core member extending axially therebetween, impedance elements cooperating with said solenoids to form a bridge network including means for balancing said network for A. C., at least one of said impedance elements being a variable resistance, means for applying A. C. to a pair of bridge points of said network, means for rectifying the unbalance potential across the complementary bridge points, a filter for removing ripple, and an indicator responsive to said rectified potential.

6. Displacement and acceleration measuring apparatus comprising a pair of spaced coaxial solenoids, a core member extending axially therebetween, impedance elements cooperating with said solenoids to form a bridge network including means for balancing said network for A. C., at least one of said elements being a variable capacity, means for applying A. C. to a pair of bridge points of said network, means for rectifying the unbalance potential across the complementary bridge points, a filter for removing ripple, and an indicator responsive to said rectified potential.

7. In an electric circuit for displacement measuring apparatus, a bridge network including a pair of elements having self-inductance and resistance and spaced for low mutual inductance forming two arms thereof, a member having permeable portions for varying the self-inductance of said elements in response to relative displacement between said member and said elements, a resistance connected between said two elements, a sliding contact thereon determining one bridge point, a pair of resistances forming the principal portions of the two other arms of said bridge, a resistance connected between said pair of resistances, means for adjusting the value thereof, a sliding contact thereon determining the bridge point opposite said first point, means for applying an A. C. potential to one pair of bridge points, and means for exhibiting the potential across the complementary bridge points as a measure of the displacement of said permeable member.

8. Displacement and acceleration measuring apparatus comprising, a pair of solenoids spaced axially to substantially reduce the magnetic coupling therebetween and having an axial width small in comparison to their mean diameter, a relatively movable, core member having end portions inductively related to said solenoids, spring means for supporting said core member centrally with respect to said solenoids while allowing axial movement thereof, a pair of impedances connected to said two solenoids to form a bridge network, means for applying an A. C. potential to said network, and an indicator energized from said network and responsive to the potential difference across bridge points thereof resulting from relative movement of said core member and solenoids.

RALPH K. BONELL.